March 23, 1965 I. S. BLONDER ETAL 3,175,033

TELEVISION RECEIVER CONTROL USING FILTER FOR CARRIER REMOVAL

Filed Aug. 26, 1960 2 Sheets-Sheet 1

INVENTORS
ISAAC S. BLONDER
BEN H. TONGUE

BY Pines and Pines

ATTORNEYS

TELEVISION RECEIVER CONTROL USING FILTER FOR CARRIER REMOVAL

Filed Aug. 26, 1960

2 Sheets-Sheet 2

INVENTORS
ISAAC S. BLONDER
BEN H. TONGUE

BY Rines and Rines

ATTORNEYS

United States Patent Office 3,175,033

Patented Mar. 23, 1965

3,175,033

TELEVISION RECEIVER CONTROL USING FILTER FOR CARRIER REMOVAL

Isaac S. Blonder, 5 Crestview, and Ben H. Tongue, 41 Ferris Drive, both of West Orange, N.J.

Filed Aug. 26, 1960, Ser. No. 52,185
21 Claims. (Cl. 178—5.1)

The present invention relates to methods of and apparatus for television reception and, more particularly, to systems in which it is desired to prevent the reception of a particular television program except by subscribers to a predetermined television service.

Over the past decade and a half, numerous systems have been evolved for so-called "Pay-Television"; that is, systems wherein the user of a home or other television receiver cannot effectively receive a special television program that has been transmitted solely for those who employ a subscription service. Some of these prior systems involve extra subscription equipment whereby special signals are transmitted, along telephone lines or other lines, and, upon reception, clarify a picture signal transmitted in distorted form, thereby to enable the subscriber to view an undistorted subscription program. Other systems have involved the transmission of particular coded or similar signals together with the television program. A subscriber can receive the coded signals and utilize them to obtain an intelligible picture, whereas a non-subscriber cannot, with his equipment, receive an intelligible picture and sound program. Numerous ramifications of these basic types of systems have been proposed. While they have been found to operate in test and limited practice with varying degrees of success, they all have been quite costly in the quantity and nature of specialized equipment and, generally, in the necessity for the transmission of special kinds of coding or other signals to aid in the process of rendering pictures unintelligible to non-subscribers and intelligible to subscribers.

An object of the present invention, on the other hand, is to provide an extremely simple, and yet effective, system and method of subscription television and the like that overcomes these difficulties of special equipment and special modification of the transmitted programming; and that, to the contrary, provides for limited equipment at the subscription receiver for enabling the intelligible reception of a program that can not otherwise be rendered intelligible.

A further object of the invention is to provide a new and improved television receiving system.

Still a further object is to provide an inexpensive and yet highly effective subscriber television system that may, if desired, be operated with solely mechanical parts, and that is void of the necessity for coding signals or other special equipment, including void of the necessity for distorting the transmitted channel program.

Other and further objects will be explained hereinafter and will be more particularly pointed out in connection with the appended claims. In summary, the invention relates to television apparatus for receiving a combination of frequency-displaced picture and sound carrier frequency signals, respectively amplitude and frequency-modulated. Within the apparatus is provided conventional means for amplifying the received signals and frequency-discriminator means operable above a predetermined threshhold value of input signal level thereto from the amplifying means to reject amplitude modulation and to detect frequency modulation, thereby to produce the desired sound signal. In accordance with the invention, a narrow band network is employed containing impedance elements selectively tuned substantially to the picture carrier frequency, with means for optionally inserting the network into the circuit with the said received signals, thereby to render the picture signal unintelligible. The network is rather critically designed so as to provide sufficient attenuation at the said picture carrier frequency to reduce the said input signal level to the discriminator means below the said threshold value, thereby rendering the discriminator means incapable of rejecting amplitude modulation and thus distorting the sound signal. A coin-operated switch system, or other mechanical or electromechanical means, may readily be employed effectively to insert or remove the network in or from the circuit, thereby to enable a subscriber to receive an otherwise unintelligible picture and sound program which, though transmitted in intelligible form from the station, is rendered unintelligible by the simple network of the present invention.

The invention will now be described in connection with the accompanying drawing, FIG. 1 of which is a block-diagram, including circuit details, of the invention in preferred form;

Figure 1:
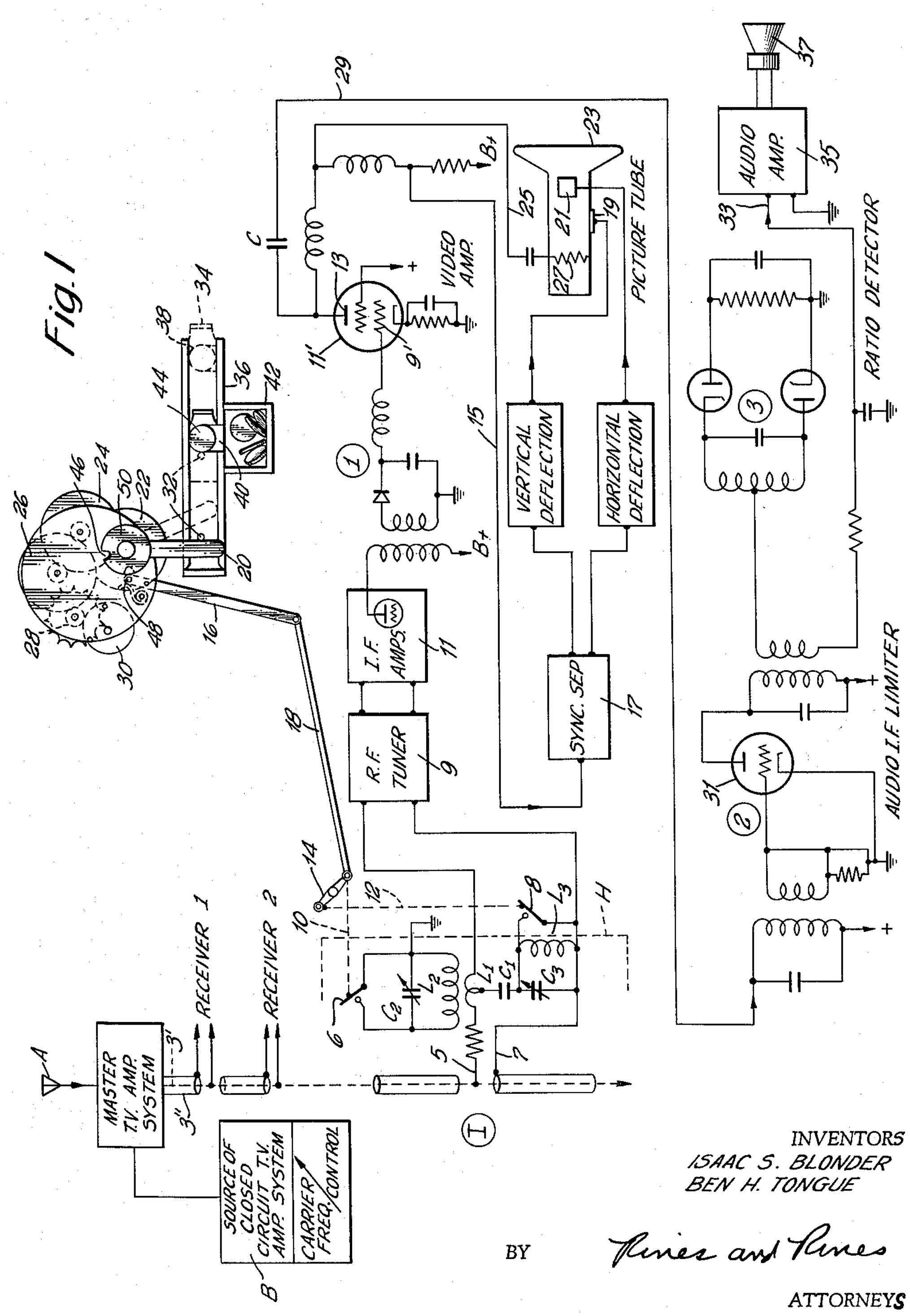

Referring to the drawing, conventional television programs, comprising a plurality of different-frequencied channels, may be received in an antenna A from conventional television transmitting studios or from a source of closed circuit television, indicated at B. The signals may be fed through a master television amplifier system, so labelled, along a transmission line 3′, 3″, illustrated as of the coaxial type, from which signals may be tapped off by different home or other conventional television receiving systems, as indicated at "Receiver 1," "Receiver 2," etc. A third receiver is shown at I, in circuit and block-diagram form, it being understood that the other receivers tapping off the line 3′, 3″, may be of similar form. At the point I, the television signals are received and fed by conductors 5 and 7 to the input of a radio-frequency tuner and amplifying system 9 which, in conventional fashion, feeds through intermediate-frequency amplifier stages 11 that produce beat on intermediate frequencies for ultimate application to the control or input electrode 9′ of one more video amplifier stage 11′, as is well-known in television receiving practice. The details of this circuit and other conventional elements of FIG. 1 are not shown in order not to complicate the drawings with details of well-known circuits that actually form no part of the degree of novelty of the present invention. Reference may be made, however, to conventional texts and other publications for a more detailed description of the exact circuits of this character, fully understood by those skilled in this art, such as are described, for example, in "Television Engineering Hand Book," Fink McGraw-Hill, 1947.

Figure 3A:
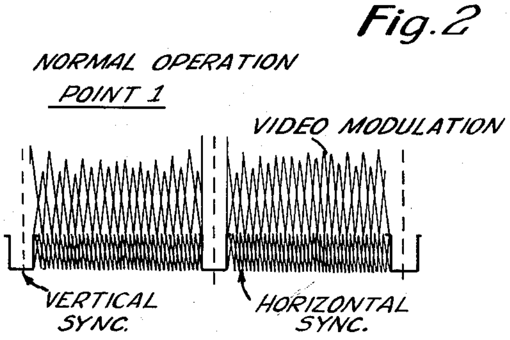
FIG. 3A is a wave-form of the received signals at the input to the video amplifier stages of the system of FIG. 1.
Figure 3B:
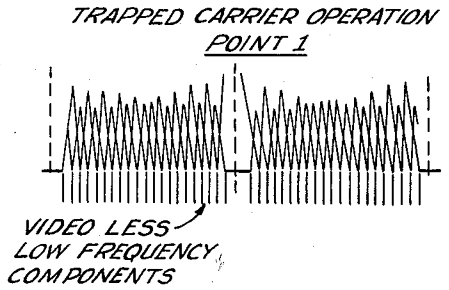
FIG. 3B is a similar view of the distorted received signals with the network of the present invention inserted to trap the desired frequencies.

The input to the video amplifier stage or stages 11' is indicated by the numeral 1, and voltage wave-forms thereat are indicated, as before stated, in FIGS. 3A and 3B under two conditions of operation. From the anode output electrode 13 of the video amplifier-stage or stages 11' are fed synchronizing signals along the path 15 to a conventional synchronizing separator circuit 17, from which vertical and horizontal deflection signals are obtained for application respectively, to the vertical and horizontal deflection plates or other deflection means 19 and 21 of the television receiver cathode-ray display tube, labelled "Picture Tube." The picture signals of video frequency that produced the black and white contrasts upon the fluorescent screen 23 of the picture tube are also shown fed from the anode electrode 13 of the video stages 11' by way of conductor 25 to, for example, the control-grid electrode 27 of the picture tube, in order to intensity-modulate the electron stream therein. Again, for purposes of not complicating the drawing with well-known details that are not part of the novelty of the present invention, other electrodes in the picture tube and other circuit details are not illustrated, though they are fully described in the above-mentioned text. Through a coupling capacitance C and a conductor 29, further output is taken from the video amplifier stage or stages 11' to the input circuit 2 of the audio-frequency limiter stage or stages 31, again, of conventional configuration. The output of the stage or stages 31 is coupled to a conventional ratio detector or other frequency discriminator 3 from which an audio or sound signal is fed at 33 for application to audio amplifier stages 35, and ultimate reproduction in the television receiver loud speaker 37, as is well known.

In accordance with the present invention, a specially designed network is employed, having certain critical parameters and relationships, and inserted in a particular position of the receiver of FIG. 1, to imbue the receiver with the property of providing an unintelligible distorted picture and sound signal of a predetermined channel. By simple mechanical or electrical mechanical means externally operable a subscriber may effectively remove the network from the circuit in order to render the system capable of receiving an undistorted picture and sound signal of the predetermined channel.

In the illustrated example, the network means is shown constructed in the form of a cancellation-trap, comprising two non-infinitely attenuating filter networks, the transmission characteristics of which are equal and opposite in phase, thus producing theoretically infinite attenuation, somewhat like a bridge or null-T network. The upper network element comprises inductance $L_2$ and capacitance $C_2$, shown having one terminal grounded and provided with switch means 6 for effectively short-circuiting the same, when desired. This filter network is coupled to the lower network elements $L_1$, $C_1$, $L_3$, $C_3$, the latter of which may also be short-circuited through the closing of a switch 8. The switches 6 and 8 are illustrated as ganged to operate together in response to the action of a lever 14, mechanically connected through 12 to the switch 8 and through 10 to the switch 6.

Figure 2:
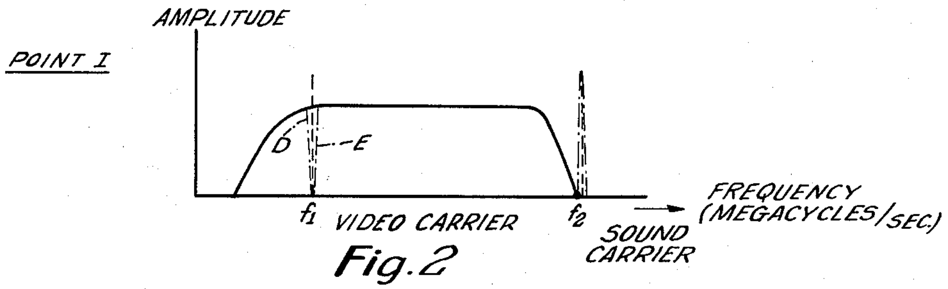
FIG. 2 is a graph plotting amplitude along the ordinate and frequency along the abscissa and indicating the video and sound carrier transmitted signals.

With the switches 6 and 8 in the illustrated position, the networks are effectively in circuit. In accordance with the present invention, unlike prior-art proposals that employ broad-band network systems or that otherwise attempt to filter out a complete television frequency channel, the networks $L_2$–$C_2$ and $L_1$–$C_1$–$L_3$–$C_3$ are selectively and narrowly tuned substantially to the video carrier frequency $f_1$ of FIG. 2. The solid line curve of FIG. 2 shows the amplitude versus frequency distribution of the received channel signals in the absence of the network elements of the present invention. The sound carrier frequency is slightly above the upper limit of the video band, as shown at $f_2$. It has been discovered that if one uses such a narrow band network system and tunes the elements substantially to the video carrier frequency $f_1$ with but slight side-bands, say of the order of 30 kilocycles, in order to embrace, also, the low-frequency vertical synchronizing signals, that a narrow-band trapping rejection of the type illustrated by the dash-dot steeply falling curve portion D and steeply rising curve portion E will be produced. It has been found, in practice, that at least 20 decibels of attenuation are required effectively to produce the results contrasted in FIGS. 3A and 3B by means of this narrow-band trapping operation at the video carrier frequency. In FIG. 3A, there is shown the wave-form that would normally appear at the input 1 of the video amplifier stages 11', comprising the intermediate or beat frequency combination of the picture amplitude-modulated and sound frequency-modulated signals, together with the vertical and horizontal synchronizing signals, so labelled. With the particular narrow-band tuning above referred to at the network input to the radio-frequency amplifying stages 9, between the transmission line 3'—3" and the radio receiver proper to FIG. 1, a trapped signal, FIG. 3B, is produced at the input 1 of the video amplifier stages 11', void of the vertical synchronizing signals and other low-frequency synchronizing-signal components.

It will thus be seen that a distorted and unintelligible picture signal will be relayed from the video stage 11', but the sound signal may still be intelligible.

Figure 3C:
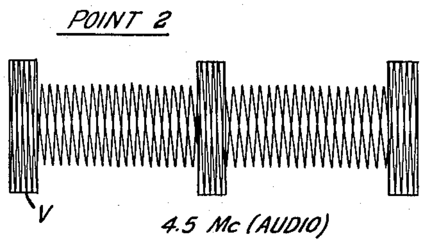
FIG. 3C is a wave-form under the conditions similar to those of FIG. 3A, taken at the input to the audio intermediate frequency limiter of the system of FIG. 1.
Figure 3D:
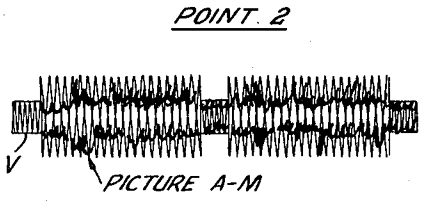
FIG. 3D is a wave-form, under conditions similar to that condition illustrated at FIG. 3B, of the same said audio intermediate frequency limiter input.
Figure 3E:
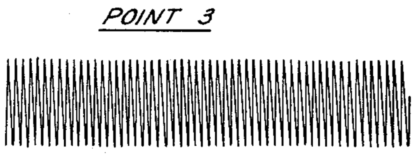
FIG. 3E is a wave-form diagram at the ratio detector of the system of FIG. 1 in the normal operating condition of FIGS. 3A and 3C.
Figure 3F:
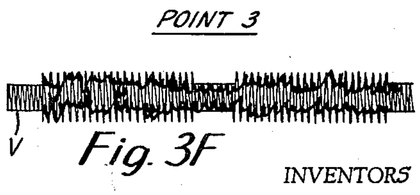
FIG. 3F is a wave-form diagram of the signal at the same location under the conditions of network-trapping, similar to the condition obtaining in connection with the wave-forms of FIGS. 3B and 3D.

In accordance with hte present invention, therefore, the same network elements $L_2$–$C_2$, $L_1$–$C_1$–$L_3$–$C_3$ are further adjusted so as to increase the degree of attenuation such that the input signal level at the input 2 of the audio intermediate-frequency limiter 31, is below that threshold level or value of signal at which the ratio detector 3 can discriminate against amplitude modulation and reproduce purely the frequency-modulation sound signal. In actual practice, for example, it has been found that the attenuation of the network elements $L_2$–$C_2$, $L_1$–$C_1$–$L_3$–$C_3$, should be increased to at least the order of 40 decibels in order to reduce the input signal level at the input 2 sufficiently to insure that the signal level at the input 3 to the ratio detector is below that threshold value at which the detector can function to discriminate against amplitude modulation. Under normal conditions, accordingly, with the network elements effectively out of circuit, the type of wave-form illustrated in FIG. 3C will be produced; such as a 4½ megacycle sound signal. The portions of the signal at the region V, corresponding to the vertical synchronizing signals, will become much greatly reduced in amplitude, as shown in FIG. 3D, through the added attenuation of the network system of the present invention. A first distortion takes place in the process of mixing in the video detector and amplifying stage, which produces the 4½ megacycle intermediate frequency sound signal. The product of this mixing is dependent upon the amplitude of the weaker of the input signals to be mixed. Since the network greatly reduces the video carrier frequency, the output of the video detector will be controlled by the reduced amplitude of the picture signal. Amplitude modulation on the picture signal thus tends to produce hash and a buzzing distortion sound component. Secondly, under the circumstances of greatly reduced or trapped video carrier, there will be produced at the ratio detector 3, the signal of FIG. 3F, having the hum or buzz of repetition of the signal portions V, and without the elimination of the amplitude modulation. A distorted sound signal is thus reproduced in the speaker 37; whereas, in the absence of the network, the substantially pure frequency modulation discriminated audio signal of FIG. 3E would be reproduced, providing an undistorted sound signal in the loudspeaker 37.

Through the relatively simple expedient, accordingly, of the particular critical narrow-band tuned network of the present invention, and the critical adjustment of the degree of attenuation with respect to the threshold value of discrimination of the frequency discriminator 3 and limiter system 2, an unintelligible picture and sound signal is produced with the network of the present invention in circuit, evn though a normal program has been passed along the transmission line 3′, 3″. The insertion of the network system of the present invention in the wall outlet of a master antenna distribution system, as schematically represented by the dash-line H, or in the television receiver set itself, renders the set incapable of receiving intelligibly a predetermined subscriber picture and sound signal, even though intelligible signals are actually transmitted along the transmission line 3′ and 3″. If the system indicated to the left of the housing H is within the wall of an apartment house, for example, it would be extremely difficult, if not impossible, to tamper with this system. In addition, because of the narrow-band character of the filter network of the present invention, again, as distinguished from prior-art attempts to employ broad-band filtering or trapping, absolutely no effect upon the adjacent television channel frequencies is evident, so that proper operation of the tuner 9 will result in the non-subscriber receiving the adjacent television programs without any interference whatsoever. It will be noted, moreover, that there is absolutely no necessity, in accordance with the present invention, for sending coding signals or using special subscriber signals or unscrambling signals, as is required in most of the prior-art proposals, and that a very inexpensive, but highly effective subscriber device has been provided.

It remains to explain how the subscriber might operate the switches 6 and 8 effectively to remove the network means from circuit so that an intelligible picture and sound program may be viewed on the tube 23 and heard in the lound speaker 37 in connection with the subscriber channel. A conventional coin-operated spring time mechanism device has been illustrated operating the lever arm 14, through any other type of well-known subscriber or coin-operated system may be employed. In the illustrated example, the viewer inserts a coin 44 in slot 38, and pushes a slider 34 along slide 36 to carry the coin 44 into position where it is deposited in a box 42 by passing through a chute 40. As the slider 34 passes along the slide 36, a pin 32 attached to top of slider 34 engages a cocking arm 20 and moves it clockwise so as to load a spring-powered gear 22. The clockwise movement of this arm 20 causes pin 48 to rise out of a notch 46 onto a cam 50, and causes the spring-loaded arm 16 to transmit mechanical movement through arm 18 to a bell crank 14, and through rods 10 and 12 to close switches 6 and 8. The powered gear 22 has a governed speed through an escapement chain consisting of reduction gear 24, reduction gear 26, escapement gear 28, and rocker wheel 30. This causes cocking arm 20 to move slowly back to its original position, and upon reaching its original position spring tension on the arm 16 forces the pin 48 into notch 46 and opens switches 6 and 8 through the mechanical linkage 10, 12, 14, 16, 18. By this means, therefore, or by utilization of any other timing or counting system 3, the subscriber may be caused to pay for the reception of the subscriber program.

It should also be observed that components of the network means, namely $L_1$–$C_1$, are also preferably adjusted to provide an impedance match to the transmission line 3′, 3″, such as a 75-ohm coaxial line, both with the switches 6 and 8 open and closed. The same components, thus, assist in accomplishing the matching function and assist in serving together with the other network elements to provide the required trapping and attenuation.

If it is desired to transmit a barker or other further picture into the system of FIG. 1, particularly in the case of the closed circuit television system B, the carrier frequency may be slightly shifted, as by the "carrier frequency control," and the barker signal transmitted therealong. Since this shift in carrier frequency is slightly outside the rejection region D, E of FIG. 2, a barker picture will be received, perhaps with some less definition in the picture signal. The subscriber may then be tempted by the barker program to subscribe to the main program which will be transmitted with the carrier frequency control shifted back to the original carrier $f_1$ that the network means traps in the absence of payment by the subscriber.

While the system of the present invention embodies purely mechanical parts insofar as the placing of the system in condition for subscription or inffective to receive an intelligible program, electro-mechanical relays may, if desired, be employed. The present invention, it is believed, represents the essence of simplicity and effectiveness, consistent with low cost that makes the subscriber system, perhaps for the first time, within the reach of the complete public.

Further modifications will occur to those skilled in the art and all such are considered to follow within the spirit and scope of the invention as defined in the appended claims.

What is claimed is:

1. In television apparatus for receiving a combination of frequency-displaced picture and sound carrier-frequency signals respectively amplitude and frequency modulated, means for amplifying the received signals, frequency-discriminator means operable above a predetermined threshold value of input-signal level thereto from the amplifying means for rejecting amplitude modulation and detecting frequency modulation, corresponding to the desired sound signal, narrow-band network means containing impedance elements selectively tuned substantially to the picture carrier frequency, means for optionally inserting the network means in circuit with the said received signals, the network means rendering the picture signal unintelligible, and having sufficient attenuation at the said picture carrier frequency to reduce the said input signal level to the discriminator means below the said threshold value at which the discriminator means is incapable of rejecting amplitude modulation, thus distorting the sound signal.

2. Apparatus as claimed in claim 1 and in which the network means is disposed between the said amplifying means and transmission-line means carrying the carrier frequency signals, and the said network impedance elements simultaneously are adjusted effectively to match the impedance of the said apparatus to the transmission-line means.

3. In television apparatus for receiving a combination of frequency-displaced picture and sound carrier-frequency signals respectively amplitude and frequency modulated, means for amplifying the received signals, frequency-discriminator means operable above a predetermined threshold value of input-signal level thereto from the amplifying means for rejecting amplitude modulation and detecting frequency modulation, thereby to produce the desired sound signal, narrow-band network means containing impedance elements selectively tuned substantially to the picture carrier frequency, means for optionally inserting the network means in circuit with the said received signals, at a region in advance of the said amplifying means, the network means rendering the picture signal unintelligible, and having sufficient attenuation at the said picture carrier frequency to reduce the said input signal level to the discriminator means below the said threshold value at which the discriminator means is incapable of rejecting amplitude modulation, thus distorting the sound signal.

4. In television apparatus for receiving a combination of frequency-displaced picture and sound carrier-frequency signals respectively amplitude and frequency modulated, means for amplifying the received signals, frequency-discriminator means operable above a predetermined threshold value of input-signal level thereto from the amplifying means for rejecting amplitude modulation and detecting frequency modulation, corresponding to the desired sound signal, narrow-band network means containing impedance elements selectively tuned substantially to the picture carrier frequency, means for optionally inserting the network means in circuit with the said received signals, the network means rendering the picture signal unintelligible, and having sufficient attenuation at the said picture carrier frequency to reduce the said input signal level to the discriminator means below the said threshold value at which the discriminator means is incapable of rejecting amplitude modulation, thus distorting the sound signal, and means operable with the network means so inserted, for slightly shifting the picture carrier-frequency signal, thereby to render intelligible a received further picture signal of the said shifted frequency, and to raise the said input signal level above the said threshold value, thereby to provide an intelligible sound signal.

5. In television apparatus for receiving a combination of frequency-displaced picture and sound carrier-frequency signals respectively amplitude and frequency modulated, means for amplifying the received signals, frequency-discriminator means operable above a predetermined threshold value of input-signal level thereto from the amplifying means for rejecting amplitude modulation and detecting frequency modulation corresponding to the desired sound signal, narrow-band network means containing impedance elements selectively tuned substantially to the picture carrier frequency, means for inserting the network means in circuit with the said received signals, the network means rendering the picture signal unintelligible and having sufficient attenuation at the said picture carrier frequency to reduce the said input signal level to the discriminator means below the said threshold value at which the discriminator means is incapable of rejecting amplitude modulation, thus distorting the sound signal, and switch means connected with the network means and operable selectively effectively to remove the network means from circuit, thereby to provide intelligible picture and sound signals.

6. Apparatus as claimed in claim 5 and in which the said network means, when inserted in circuit, is inserted at a region in advance of the said amplifying means.

7. Apparatus as claimed in claim 5 and in which the said switch means comprises a coin-operated switch.

8. In television apparatus for receiving a plurality of frequency channels including a predetermined channel comprising a combination of frequency-displaced picture and sound carrier-frequency signals respectively amplitude and frequency modulated, with the former including side-band low-frequency picture synchronizing signals, means for amplifying the predetermined-channel received signals, frequency-discriminator means operable above a predetermined threshold value of input-signal level thereto from the amplifying means for rejecting amplitude modulation and detecting frequency modulation corresponding to the desired sound signal, network means containing impedance elements selectively tuned substantially to the picture carrier frequency and of bandwidth sufficiently narrow to reject all other of the plurality of channel frequencies but sufficient to include the said low-frequency synchronizing signals, means for optionally inserting the network means in circuit with the said received signals, the network means substantially rejecting the said picture carrier frequency and the said side-band low-frequency synchronizing signals and thus rendering the picture signal unintelligible and having sufficient attenuation at the said picture carrier frequency to reduce the said input signal level to the discriminator means below the said threshold value at which the discriminator means is incapable of rejecting amplitude modulation, thus distorting the sound signal.

9. Apparatus as claimed in claim 8 and in which the network means comprises a trap providing at least substantially forty decibels of attenuation at the said picture carrier frequency and of bandwidth substantially thirty kilocycles.

10. In television apparatus for receiving a plurality of frequency channels including a predetermined channel comprising a combination of frequency-displaced picture and sound carrier-frequency signals respectively amplitude and frequency modulated, with the former including side-band low-frequency picture synchronizing signals, means for amplifying the predetermined-channel received signals, frequency-discriminator means operable above a predetermined threshold value of input-signal level thereto from the amplifying means for rejecting amplitude modulation and detecting frequency modulation corresponding to the desired sound signal, network means containing impedance elements selectively tuned substantially to the picture carrier frequency and of bandwidth sufficiently narrow to reject all other of the plurality of channel frequencies but sufficient to include the said low-frequency synchronizing signals, means for optionally inserting the network means in circuit with the said received signals at a region in advance of the said amplifying means, the network means substantially rejecting the said picture carrier frequency and the said side-band low-frequency synchronizing signals and thus rendering the picture signal unintelligible and having sufficient attenuation at the said picture carrier frequency to reduce the said ininput signal level to the discriminator means below the said threshold value at which the discriminator means is incapable of rejecting ampltiude modulation, thus distorthe sound signal.

11. In television apparatus for receiving a plurality of frequency channels including a predetermined channel comprising a combination of frequency-displaced picture and sound carrier-frequency signals respectively amplitude and frequency modulated, with the former including side-band low-frequency picture synchronizing signals, means for amplifying the predetermined-channel received signals, frequency-discriminator means operable above a predetermined threshold value of input-signal level thereto from the amplifying means for rejecting amplitude modulation and detecting frequency modulation corresponding to the desired sound signal, network means containing impedance elements selectively tuned substantially to the picture carrier frequency and of bandwidth sufficiently narrow to reject all other of the plurality of channel frequencies but sufficient to include the said low-frequency synchronizing signals, means for optionally inserting the network means in circuit with the said received signals, the network means substantially rejecting the said picture carrier frequency and the said side-band low-frequency synchronizing signals and thus rendering the picture signal unintelligible and having sufficient attenuation at the said picture carrier frequency to reduce the said input signal level to the discriminator means below the said threshold value at which the discriminator means is incapable of rejecting amplitude modulation, thus distorting the sound signal, and means operable with the network means so inserted, for slightly shifting the picture carrier-frequency signal, thereby to render intelligible a received further picture signal of the said shifted frequency, and to raise the said input signal level above the said threshold value, thereby to provide an intelligible sound signal.

12. In television apparatus for receiving a plurality of frequency channels including a predetermined channel comprising a combination of frequency-displaced picture and sound carrier-frequency signals respectively amplitude and frequency modulated, with the former including side-band low-frequency picture synchronizing signals, means for amplifying the predetermined-channel received signals, frequency-discriminator means operable above a predetermined threshold value of input-signal level thereto from the amplifying means for repecting amplitude modulation and detecting frequency modulation corresponding to the desired sound signal, network means containing impedance elements selectively tuned substantially to the picture carrier frequency and of bandwidth sufficiently narrow to reject all other of the plurality of channel frequencies but sufficient to include the said low-frequency synchronizing signals, means for inserting the network means in circuit with the said received signals, the network substantially rejecting the said picture carrier frequency and the said side-band low-frequency synchronizing signals and thus render the picture signal unintelligible and having sufficient attenuation at the said picture carrier frequency to reduce the said input signal level to the discriminator means below the said threshold value at which the discriminator means is incapable of rejecting amplitude modulation, thus distorting the sound signal, and switch means connected with the network means and operable selectively effectively so to insert the network means and operable selectively effectively to remove the network means from circuit for a predetermined time, thereby to provide intelligible picture and sound signals from the said predetermined channel.

13. In television apparatus for receiving a plurality of frequency channels including a predetermined channel comprising a combination of frequency-displaced picture and sound carrier-frequency signals respectively amplitude and frequency modulated, with the former including side-band low-frequency picture synchronizing signals, means for amplifying the predetermined-channel received signals, frequency-discriminator means operable above a predetermined threshold value of input-signal level thereto from the amplifying means for rejecting amplitude modulation and detecting frequency modulation corresponding to the desired sound signal, network means containing impedance elements selectively tuned substantially to the picture carrier frequency and of bandwidth sufficiently narrow to reject all other of the plurality of channel frequencies but sufficient to include the said low-frequency synchronizing signals, means for optionally inserting the network means incircuit with the said received signals at a region in advance of the said amplifying means, the network means substantially rejecting the said picture carrier frequency and the said side-band low-frequency synchronizing signals and thus render the picture signal unintelligible and having sufficient attenuation at the said picture carrier frequency to reduce the said input signal level to the discriminator means below the said threshold value at which the discriminator means is incapable of rejecting amplitude modulation, thus distorting the sound signal, and coin-operated switch means connected with the network means and operable selectively effectively to remove the network means from circuit for a predetermined time, thereby to provide intelligible picture and sound signals from the said predetermined channel.

14. In television apparatus for receiving a plurality of frequency channels including a predetermined channel comprising a combination of frequency-displaced picture and sound carrier-frequency signals respectively amplitude and frequency modulated, with the former including side-band low-frequency picture synchronizing signals, means for amplifying the predetermined-channel received signals and converting the same into a beat signal representing a mixture of signals corresponding to both the picture and sound signals, a frequency-modulation discriminator limiter circuit connected to receive the beat signal and operable above a predetermined threshold value of beat input-signal level thereto for rejecting amplitude modulation and detecting frequency modulation corresponding to the desired sound signal, network means containing impedance elements selectively tuned substantially to the picture carrier frequency and of bandwidth sufficiently narrow to reject all other of the plurality of channel frequencies but sufficient to include the said low-frequency synchronizing signals, means for optionally inserting the network means in circuit with the said received signals the network means substantially rejecting the said predetermined carrier frequency and the said side-band low-frequency synchronizing signals and thus render the picture signal unintelligible and having sufficient attenuation at the said picture carrier frequency to reduce the said input signal level to the discriminator means below the said threshold value at which the discriminator means is incapable or rejecting amplitude modulation, thus distorting the sound signal.

15. Apparatus as claimed in claim 14 and in which transmission-line means is provided connected to the said amplifying means to feed the channel frequencies thereto and in which the said network means is interposed between the transmission-line means and the said amplifying means.

16. Apparatus as claimed in claim 15 and in which the said beat signal is an intermediate frequency signal fed from video amplifier means to an audio intermediate-frequency limiter and ratio detector comprising the said discriminator means.

17. Apparatus as claimed in claim 16 and in which the said transmission-line means is connected to a master anntenna system for the said plurality of channel frequencies.

18. Apparatus as claimed in claim 16 and in which the said transmission-line means is connected to a closed-circuit television system.

19. Apparatus as claimed in claim 18 and in which means is provided for shifting the carrier frequency transmitted in the closed circuit television system to introduce, with the network means inserted in circuit, a barker picture signal and the like of relatively low definition.

20. A method of the character described that comprises, receiving a combination of frequency-displaced picture and sound carrier-frequency signals respectively amplitude and frequency modulated, with the former including side-band low-frequency picture synchronizing signals; rejecting from the received signals the received picture carrier frequency and an adjacent narrow band of side-band frequencies at least sufficient to include the said side-band low-frequency synchronizing signals, thereby to distort the picture signal; feeding the remaining received signals to a frequency discriminator operable above a predetermined threshold value of input signal to reject amplitude modulation and to detect frequency modulation; adjusting the degree of the said rejections to reduce the amplitude of the said input signal level below the said threshold value, thereby to distort the sound signal; and optionally restoring the picture carrier frequency and adjacent narrow band and the said threshold input signal level.

21. A method of the character described that comprises, receiving a combination of frequency-displaced picture and sound carrier-frequency signals respectively amplitude and frequency modulated, with the former including side-band low-frequency picture synchronizing signals; rejecting from the received signals the received picture carrier frequency and an adjacent narrow band of side-band frequencies at least sufficient to include the said side-band low-frequency synchronizing signals, thereby to distort the picture signal; feeding the remaining received signals to a frequency discriminator operable above a predetermined threshold value of input signal to reject amplitude modulation and to detect frequency modulation; adjusting the degree of the said repection to reduce the amplitude of the said input signal level below the said threshold value, thereby to distort the sound signal; shifting the picture carrier frequency slight to introduce further picture and sound signals for barker purposes and the like; and optionally restoring the picture carrier frequency and adjacent narrow band and the said threshold input signal level.

References Cited in the file of this patent

UNITED STATES PATENTS

| | | |
|---|---|---|
| 1,944,226 | Dubilier | Jan. 23, 1934 |
| 2,854,506 | Pickles | Sept. 30, 1958 |
| 2,952,735 | Weiss | Sept. 13, 1960 |

FOREIGN PATENTS

| | | |
|---|---|---|
| 844,118 | Great Britain | Aug. 10, 1960 |